(12) United States Patent
Kurumado

(10) Patent No.: US 7,078,892 B2
(45) Date of Patent: Jul. 18, 2006

(54) ROTATION DETECTING DEVICE

(75) Inventor: Norihiro Kurumado, Kasugai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/231,847

(22) Filed: Sep. 22, 2005

(65) Prior Publication Data

US 2006/0082364 A1    Apr. 20, 2006

(30) Foreign Application Priority Data

Oct. 18, 2004    (JP)    ............................. 2004-302962

(51) Int. Cl.
  *G01B 7/30*    (2006.01)
(52) U.S. Cl. .............................. 324/207.21; 324/207.25
(58) Field of Classification Search ........... 324/207.21, 324/207.25
  See application file for complete search history.

(56) References Cited

U.S. PATENT DOCUMENTS 6,452,381 B1    9/2002    Nakatani et al.
6,577,122 B1 *    6/2003    Yokotani et al. ........ 324/207.21
2003/0173955 A1    9/2003    Uenoyama
2003/0197503 A1 *    10/2003    Kawano et al. ......... 324/207.21
2005/0007102 A1 *    1/2005    Butzmann .............. 324/207.21

* cited by examiner

*Primary Examiner*—Bot LeDynh
(74) *Attorney, Agent, or Firm*—Posz Law Group, PLC

(57) ABSTRACT

A rotation detecting device includes a rotary member having teeth, a biasing magnet, a magnetic sensor unit and a differential amplifier circuit for providing an output signal Vd. The sensor unit includes four bridge circuits of magnetoresistive elements that provide voltage signals V1, V2, V3, V4. The differential amplifier circuit includes a first differential amplifier for providing a first signal that is a difference between the voltage signals V1, V2, a second differential amplifier for providing a second signal that is a difference between the voltage signals V3, V4, a first circuit for providing a first amplified signal of the first signal amplified by a variable gain α, second circuit for providing a second amplified signal of the second signal amplified by a fixed gain and a third differential amplifier for providing the output signal Vd by a difference between the first amplified signal and the second amplified signal. The variable gain is adjusted to provide a minimum air-gap characteristic point that corresponds to a fixed rotation angle relative to the teeth.

8 Claims, 16 Drawing Sheets

ROTATION DETECTING DEVICE

CROSS REFERENCE TO RELATED APPLICATION

The present application is based on and claims priority from Japanese Patent Application 2004-302962, filed Oct. 18, 2004, the contents of which are incorporated herein by reference.

BACKGROUND OF THE INVENTION

1. Field of the Invention

The present invention relates to a rotation detecting device that employs a plurality of magnetoresistive elements and a biasing magnet to be used for an engine control system, antilock brake system (ABS) of a vehicle, etc.

2. Description of the Related Art

Engine ignition timing is usually determined on the basis of a crankshaft angle and a camshaft angle. For example, the camshaft of a four-cycle multi-cylinder engine makes one turn when the crankshaft makes two turns. Therefore, cylinder discrimination data are inputted made while the cam makes one turn, and the ignition timing data are inputted while the crankshaft makes one turn.

U.S. Pat. No. 6,452,381B1 or its counterpart JP-11-237256A2 discloses a rotation detecting device, which is shown in FIG. 15 of this application. This prior art rotation detecting device includes a pair of MRE bridge circuits 66 and 69 of magnetoresistive elements (MRE), which are symmetrically disposed with respect to a center line that extends through the magnetic center of a gear type rotor 62 so that detecting axis of one of the bridge circuits is 90 degrees different from the detecting axis of the other. The MRE bridge circuit 66 is comprised of a pair of series-connected MRE 64 and MRE 65, and the MRE bridge circuits 69 is comprised of a pair of series-connected MRE 67 and MRE 68. The gear type rotor 62 has three teeth 62a and valley portions 62b formed between the teeth 62a. The MRE bridge circuits 66, 69 are respectively disposed at positions shifted from the magnetic center of the biasing magnet 63 in the rotating direction. When the gear type rotor 62 rotates about its center axis, the MRE bridge circuit 66 provides an output signal at the joint of the MRE 64 and the MRE 65, and the MRE bridge circuit 69 provides an output signal at the joint of the MRE 67 and the MRE 68. Both output signals are inputted into a differential amplifier 70, which amplifies the difference between the inputted signals to provide an output signal that corresponds to a rotation angle of the rotor.

In the above rotation detecting device, a minimum air-gap characteristic point may change if one of the teeth of the gear type rotor 62 is different in shape from the others. Incidentally, the minimum air-gap characteristic point is a point where the differential amplifier 70 provides the same output signal when the biasing magnet rotates the same rotation angle although the air gap between the gear type rotor 62 and the MRE bridge circuits 66, 69 changes.

U.S. Pat. No. 2003 0173955 or its counterpart JP-A 2003-269995 proposes to keep the air-gap minimum characteristic point constant by repeating differential amplification. However, it is very difficult to fix the magnetic sensors to an accurate position of an integrated circuit and to uniformly keep the air gap between the biasing magnet and the magnetic sensor.

When the magnetic sensor 63 is fixed at a normal position as shown in FIG. 16, the differential amplifier 70 provides a normal output signal as shown in FIG. 16C. However, the differential amplifier 70 provides an abnormal signal as shown in FIG. 16D if the magnetic sensor 63 is fixed at a position shifted vertically (in Y-direction), horizontally (in X-direction) or angularly (by $\theta$) from the normal position as shown in FIGS. 16B, 16E and 16F. This abnormal signal may cause improper ignition timing.

SUMMARY OF THE INVENTION

Therefore, it is an object of the invention to provide an improved rotation detecting device that can provide normal output signals even if the magnetic sensor is fixed at a position that is shifted from a normal position.

According to an aspect of the invention, a rotation detecting device includes a magnetic rotary member having a plurality of teeth on its outer periphery, a biasing magnet for providing the rotary member with a magnetic field, a magnetic sensor unit disposed between the teeth and the biasing magnet, and a differential amplifier circuit for providing a differential output signal Vd. The differential amplifier circuit includes a first differential amplifier for providing a first differential signal that is a difference between the output signals V1 and V2, a second differential amplifier for providing a second differential signal that is a difference between the output signals V3 and V4, first means for providing a first amplified signal of the first differential signal amplified by a variable gain $\alpha$, second means for providing a second amplified signal of the second differential signal amplified by a fixed gain and a third differential amplifier for providing the differential output signal Vd that is a difference between the first amplified signal and the second amplified signal. The magnetic sensor unit includes at least four bridge circuits of magnetoresistive elements arranged to respectively provide output signals V1, V2, V3 and V4 that change with a change in the direction of the magnetic field. With the above construction, the variable gain is adjusted to provide a minimum air-gap characteristic point that corresponds to a fixed rotation angle relative to one of the teeth of said magnetic rotary member.

In the above rotation detecting device, the following conditions may be applicable:

(1) the first differential signal is V1–V2, the second differential signal is V3–V4, the first amplified signal is $\alpha$(V1–V2), the second amplified signal is 2(V3–V4), and the differential output signal Vd is 2(V3–V4)–$\alpha$(V1–V2);

(2) the first differential signal is V2–V1, the second differential signal is V4–V3, the first amplified signal is $\alpha$(V2–V1), the second amplified signal is 2(V4–V3), and the differential output signal Vd is 2(V4–V3)–$\alpha$(V2–V1);

(3) the first differential signal is V1–V2, the second differential signal is V3–V4, the first amplified signal is $\alpha$(V1–V2), the second amplified signal is V3–V4, and the differential output signal Vd is V3–V4–$\alpha$(V1–V2); and (4) the first differential signal is V2–V1, the second differential signal is V4–V3, the first amplified signal is $\alpha$(V2–V1), the second amplified signal is V4–V3, and the differential output signal Vd is V4–V3–$\alpha$(V2–V1).

In the above rotation detecting device, each of the bridge circuits has a detecting axis and four magnetic sensor elements, and the detecting axis of each sensor element is angled to the magnetic center of the biasing magnet axis by 45 degrees and to the detecting axis of another sensor adjacent thereto by 90 degrees. In addition, the four magnetic sensor elements are disposed in a matrix to be parallel to the magnetic center of the biasing magnet so that two of said sensor elements can be disposed in the first column and the other two sensor elements can be disposed in the second column and are connected in series with each other thereby providing a sensor output signal at the middle of the series connected sensor elements.

Therefore, even if outside stresses are imposed to the bridge circuits, magnetostrictive resistances can be cancelled out each other.

The above defined rotation detecting device may further includes a comparator for comparing the differential output signal with a preset level to provide a binary signal.

The above defined rotation detecting device may further include means for setting a suitable value of the gain α by a program, which includes steps of setting a temporary value of α, rotating the rotor to measure a M-E shift amount Δα, subtracting a correction value β from the temporary value of α, adding the value β to the temporary value of α, rotating the rotor to measure a M-E shift amount Δ(α+β), setting an approximation line La, setting a new value α, and repeating the above step until a suitable value of α is found.

Because the suitable value α is determined after repeated measurements, various factors that cause errors can be omitted.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A rotation detecting device 10 according to the first embodiment of the invention will be described with reference to FIGS. 1–10.

Figure 1:
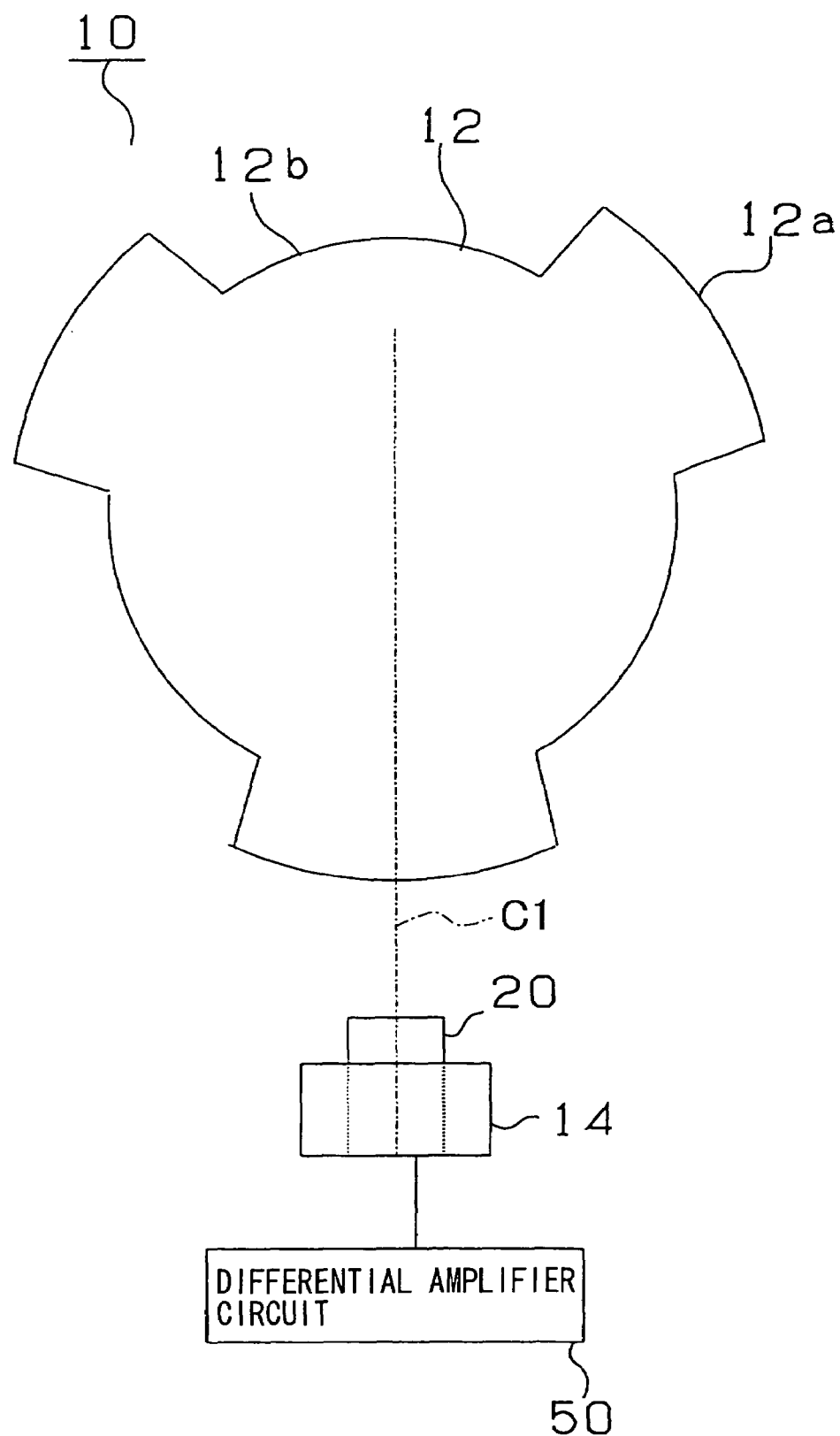
FIG. 1 is a schematic diagram showing a rotation detecting device according to the first embodiment of the invention.

As shown in FIG. 1, the rotation detecting device 10 includes a gear type rotor 12 that has three gear teeth 12a on its periphery, an IC chip 20 that has four MRE bridge circuits, a biasing magnet 14 and a differential amplifier circuit 50. The rotor 12 has an outer surface facing the biasing magnet 14, which is arranged so that its center axis C1 can extends toward the rotation axis of the rotor 12.

The biasing magnet 14 is a hollow cylindrical member, whose magnetic center is the center axis of itself. The biasing magnet 14 is magnetized so as to form an N-pole on its surface close to the rotor 12 and an S-pole on its opposite surface.

Figure 2:
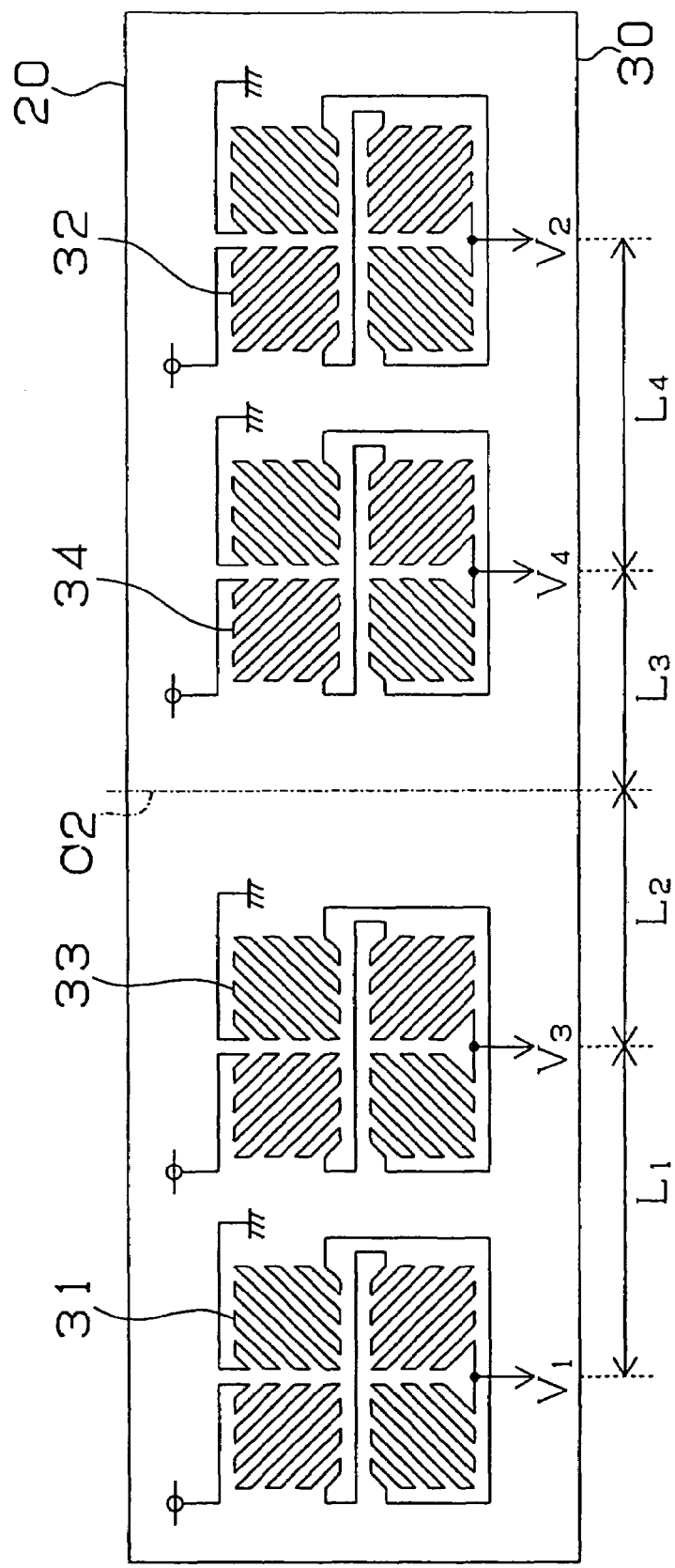
FIG. 2 is a schematic diagram showing an IC chip on which magnetic sensors are formed.

As shown in FIG. 2, the IC chip 20 is comprised of a base plate 30 and four MRE bridge circuits 31, 32, 33, 34, which are the same in structure and characteristic. The IC chip 20 is mounted on a lead frame made of copper or the like and molded into a unit with thermosetting resin such as epoxy resin. The IC chip 20 is disposed so that a portion thereof is inserted to the center hole of the biasing magnet 14 and so that a center line (a line of symmetry) C2 of the base plate 30 coincides with the rotation axis C1 of the biasing magnet 14.

The MRE bridge circuit 31 and the MRE bridge circuit 32 are disposed to be symmetrical to each other with respect to the center line C2, and the MRE bridge circuit 33 and the MRE bridge circuit 34 are also disposed to be symmetrical to each other with respect to the center line C2. Further, the MRE bridge circuit 33 is disposed at the middle between the center line C2 and a center line of the MRE bridge circuit 31, and the MRE bridge circuit 34 is disposed at the middle between the center line C2 and a center line of MRE bridge circuit 32. Thus, the distance L1 between the center lines of the MRE bridge circuits 31, 33, the distance L2 between the center lines of the MRE bridge circuit 33 and the center line C2, the distance L3 between the center line C2 and the center line of the MRE bridge circuit 34, 33 and the distance L4 between the center lines of the MRE bridge circuits 34, 32 are the same (L1=L2=L3=L4).

Figure 3A:
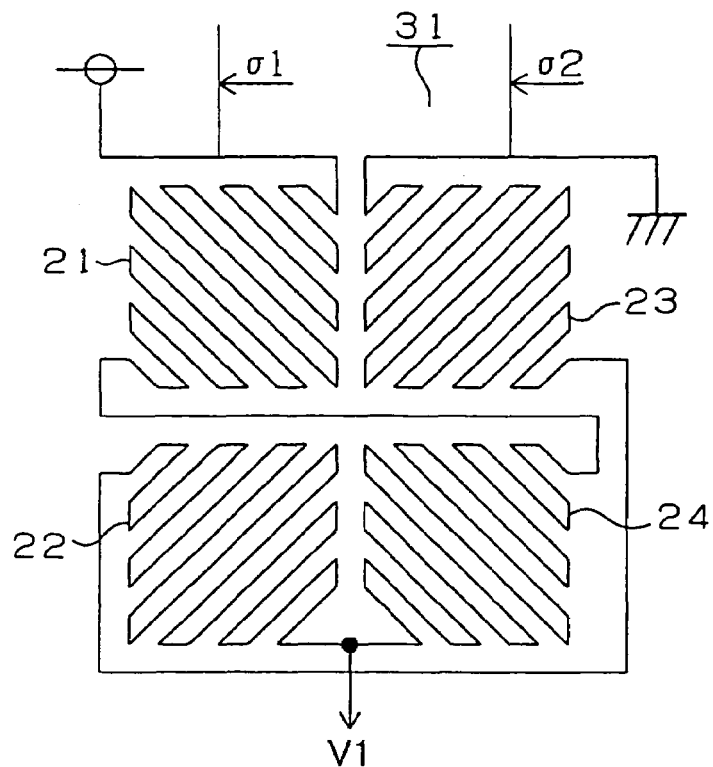
FIGS. 3A and 3b are schematic diagrams showing construction of MRE bridge circuit and its connection.
Figure 3B:
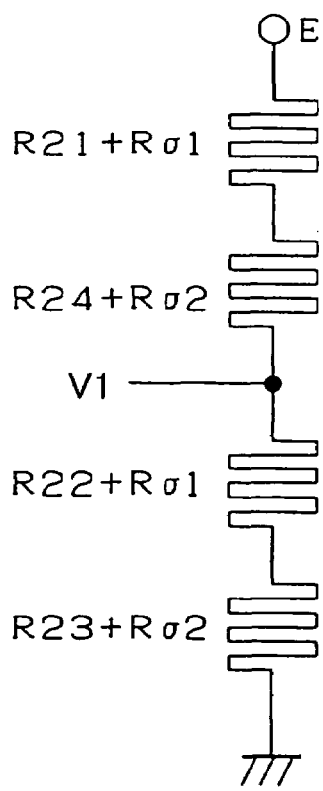

As shown in FIGS. 3A and 3B, each of the MRE bridge circuits 31–34 is comprised of four MRE 21, 22, 23, 24, each of which is made of a ferromagnetic material, such as Ni—Co alloy or Ni—Fe alloy that has anisotropic magnetoresistance. Each MRE has a pattern of generally rectangular comb teeth of various length. Each comb tooth is formed of a short wire of a fixed length on its shorter side and a pair of long wires of various length on its longer sides. Accordingly, the sensing axis of each MRE is formed along longer sides of the rectangular comb teeth. Four MRE 21, 22, 23, 24 are formed in a matrix on the base plate 30 to be parallel to the magnetic center of the biasing magnet 14 along the rotation direction of the rotor 12 so that the MRE 21, 22 can be disposed in the left or first column and so that the MRE 23, 24 can be disposed in the right or second column. Further, the MRE 21 and the MRE 24 respectively have the sensing axes that are angled by about 45 degrees to the magnetic center of the biasing magnet 14, and the MRE 22 and the MRE 23 respectively have the sensing axes that are angled by about −45 degrees to the magnetic center of the biasing magnet 14. That is, each sensing axis of the MRE 21, 24 crosses the sensing axes of the MRE 22, 23 at 90 degrees. Therefore, increasing or decreasing direction of the magnetoresistance of the MRE 21, 24 is different from increasing or decreasing direction of the magnetoresistance of the MRE 22, 23 if the direction of a magnetic field around the MRE bridge circuit 31 changes.

As shown in FIGS. 3A and 3B, the MRE 21, 24, 22, 23 are connected in series, in this order, between a power source and a ground. That is, the MRE 21 is connected in series between the power source and the MRE 24, which is connected in series with the MRE 22. The MRE 23 is also connected in series between the MRE 22 and the ground. The output signal V1 of the MRE bridge circuit 31 is provided at the joint of MRE 24 and the MRE 22. The output signals V2, V3 and V4 of the other MRE bridge circuits 33, 34 and 35 are also provided at the respective joints that correspond to the MRE 24 and the MRE 22 of the MRE bridge circuit 31. The order of the series connection can be changed to MRE 23 first to be connected to the power source, MRE 22 second, MRE 24 third, and MRE 21 to be connected to the earth.

Because the IC chip 20 is molded with thermosetting resin, a stress is imposed to it from outside. Generally, stronger stress is imposed to a portion disposed more distant from the center line C2 of the base plate 30. The amount of the stress imposed to a portion of the IC chip 20 disposed at a certain distance from the center line C2 is approximately equal to an amount of stress imposed to another portion of the IC chip disposed at the same certain distance from the center line C2. If stresses σ1, σ2 are respectively imposed to the MRE 21, 22 that are disposed at the first column of the MRE bridge circuit 23 and to the MRE 23, 24 that are disposed at the second column of the MRE bridge circuit 31, the MRE 21, 22 and the MRE 23, 24 will respectively have additional magnetostrictive resistances Rσ1 and Rσ2, as shown in FIG. 3B.

If a voltage E is applied to the MRE bridge circuit 31, the output voltage V1 thereof is expressed as follows:

$$V1=(R22+R\sigma1+R23+R\sigma2)\times E/(R21+R\sigma1+R24+R\sigma2+R22+R\sigma1+R23+R\sigma2) \quad [E1]$$

Because all the MRE have the same resistance (R21=R22=R23 R24), the output voltage V1 is not significantly affected by the outside stresses σ1, σ2. That is, even if the outside stresses σ1, σ2 are imposed to the MRE bridge circuit 31, the magnetostrictive resistances Rσ1 and Rσ2 can be cancelled out each other. Thus, the output voltage V2 of the MRE bridge circuit 32, the output voltage V3 of the MRE bridge circuit 33 and the output voltage V4 of the MRE bridge circuit 34 can be expressed in the same manner as above.

Figure 4:
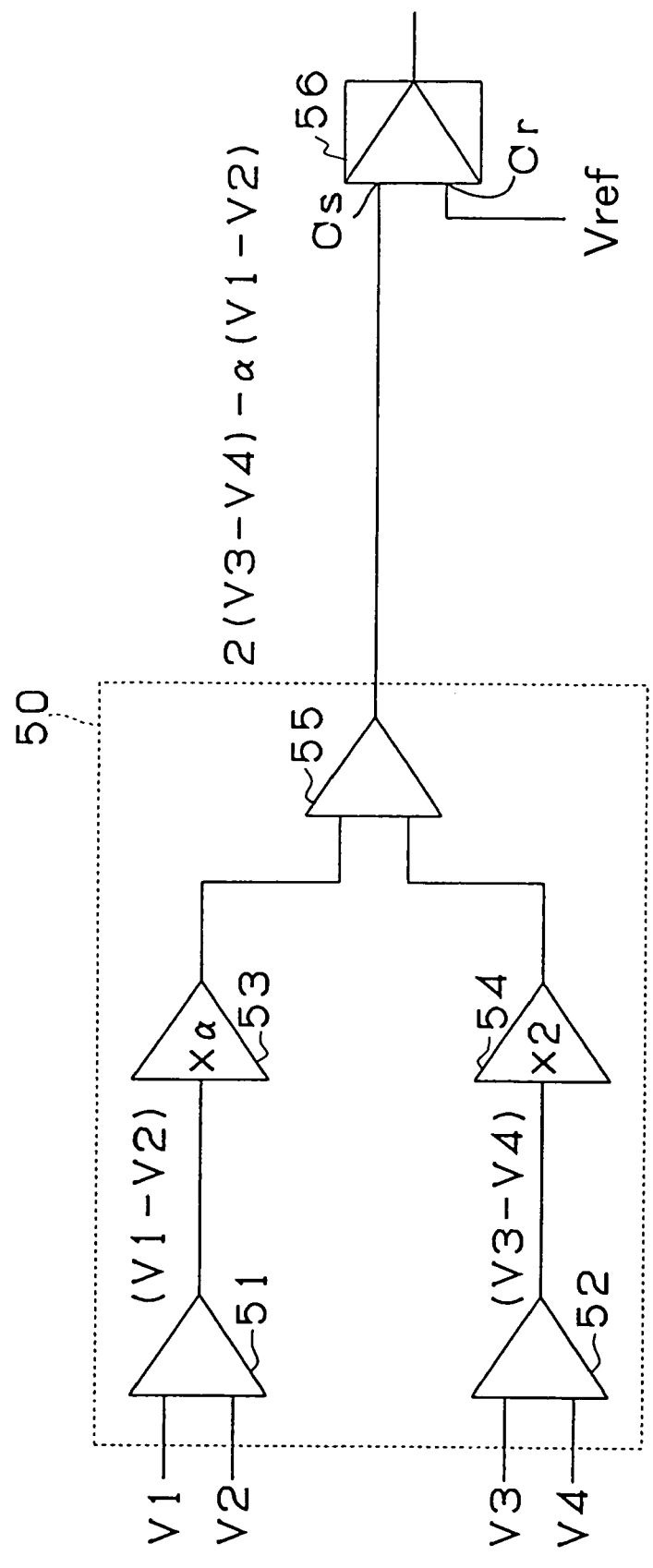
FIG. 4 is a block diagram illustrating a basic idea of a differential amplifier of the rotation detecting device according to the first embodiment.

The differential amplifier circuit 50 includes three differential amplifiers 51, 52, 55 and two amplifiers 53, 54, as shown in FIG. 4.

The differential amplifier 51 has a non-inverted input terminal that receives the output voltage V1, an inverted input terminal that receives the output voltage V2 and an output terminal that provides a difference between the output voltage V1 and the output voltage V2, that is, V1−V2. The amplifier 53 amplifies the difference by a variable gain a and provides an increased gain of the output signal, which is α(V1−V2).

The differential amplifier 52 has a non-inverted input terminal that receives the output voltage V3, an inverted input terminal that receives the output voltage V4 and an output terminal that provides a difference between the output voltage V3 and the output voltage V4, which is V3−V4. The amplifier 54 amplifies the difference and provides an amplified signal of double the difference, which is 2×(V3−V4).

The differential amplifier 54 has a pair of input terminals that respectively receive the amplified output signal of a variable gain and an amplified signal of double the difference and an output terminal that provides a differential output voltage Vd between the two input signals. That is:

$$Vd=2\times(V3-V4)-\alpha(V1-V2) \quad [E2]$$

Incidentally, the following expression may be possible if the connection of the input terminals of the differential amplifiers 51, 52 are changed from one to the other.

$$Vd=2\times(V4-V3)-\alpha(V2-V1) \quad [E3]$$

The differential output voltage Vd, which is the output signal of the differential amplifier circuit 50, is applied to an input terminal Cr of a comparator 56, which has another input terminal Cr connected to an electric source of reference voltage Vref. Therefore, the differential output voltage is converted to a binary signal. Thus, the differential output voltage Vd corresponds to the rotation angle of the rotor.

Figure 5:
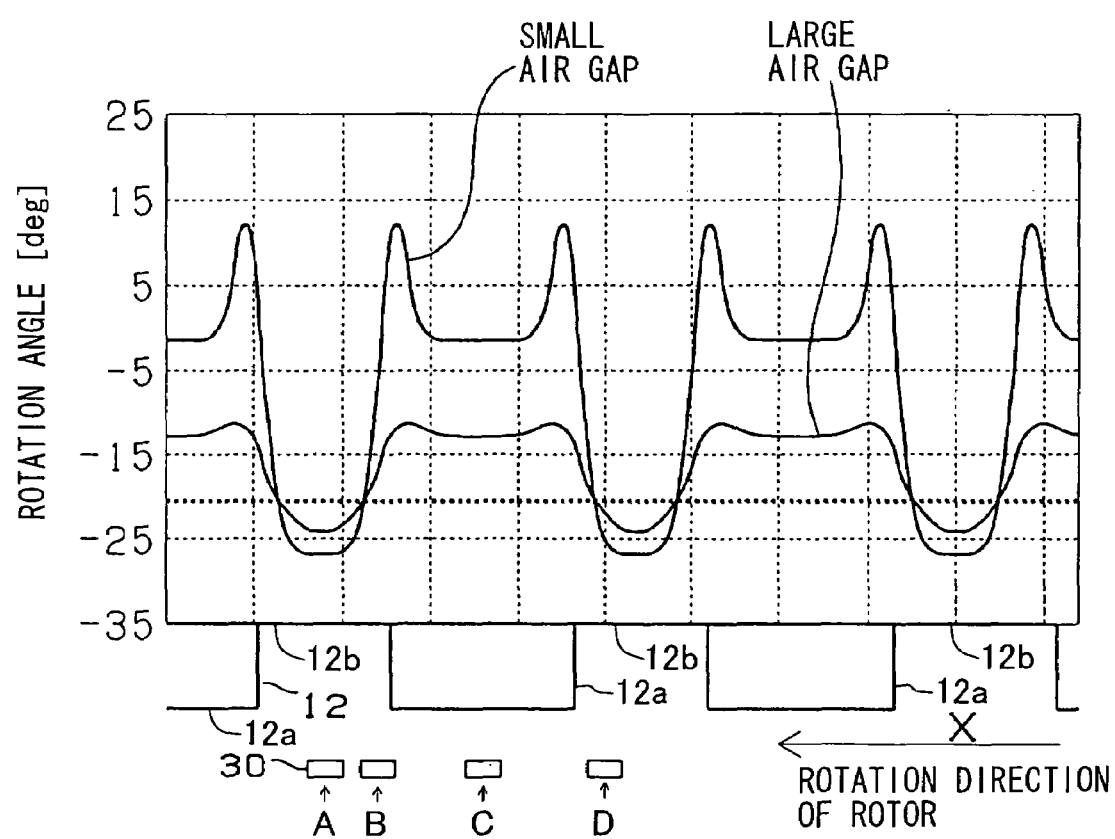
FIG. 5 is a graph showing a relationship between output voltage (in terms of rotation angle of rotor) of the differential amplifier and the position of the IC chip relative to a rotor of the rotation detecting device.

FIG. 5 shows a relationship between relative positions of the rotor to the IC's base plate 30 and the rotation angle of the rotor. As shown in FIG. 5, the rotation angle becomes smaller if the distance (air gap) of the IC chip 20 from the rotor 12 becomes smaller. However, there are the minimum air-gap characteristic points at a rotation angle of about −20 degrees, where the differential output voltage Vd is unchanged even if the air gap changes. The rotor 12 rotates in a direction indicated by an arrow X. The MRE bridge circuits 31–34 (or the base plate 30) increase their output voltages when the magnetic field shifts right and decrease their output voltages when the magnetic field shifts left.

When the MRE bridge circuits 31–34 are positioned at one of the valley portions, which is indicated by A, the lines of magnetic force run straight, so that the differential output voltage Vd becomes medium. When the MRE bridge circuits 31–34 are positioned at one of the leading edges of the teeth, which is indicated by B, the lines of magnetic force incline to the teeth, so that the differential output voltage Vd becomes its maximum. When the MRE bridge circuits 31–34 are positioned at one of the teeth, which is indicated by C, the lines of magnetic force run straight, so that the differential output voltage Vd becomes medium. When the MRE bridge circuits 31–34 are positioned at one of the trailing edges of the teeth, which is indicated by D, the lines of magnetic force incline to the teeth, so that the differential output voltage Vd becomes its maximum.

Figure 6A:
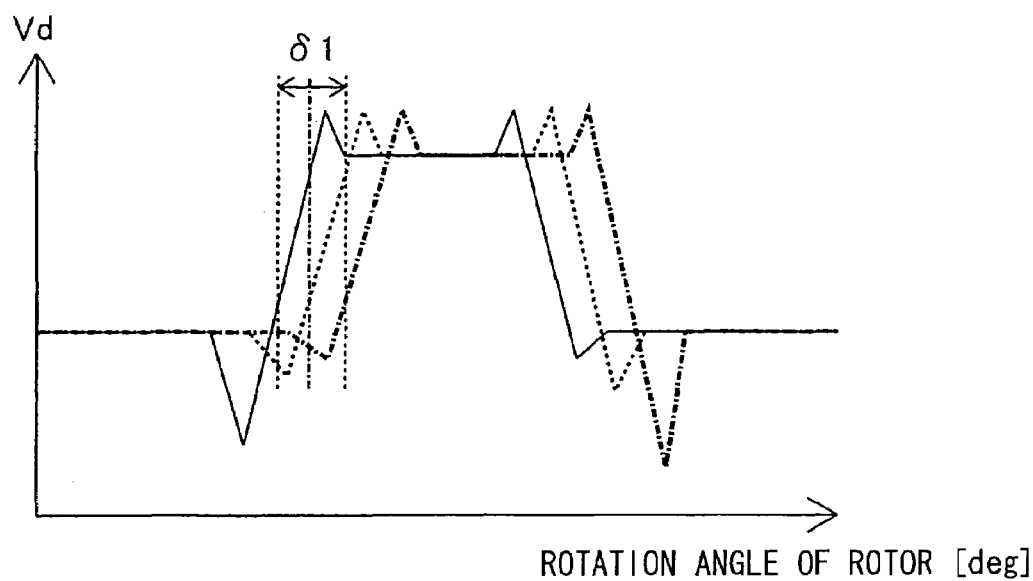
FIG. 6A is a graph showing changes in the output voltage of the differential amplifier when a center axis of the rotor shifts in a horizontal direction.
Figure 6B:
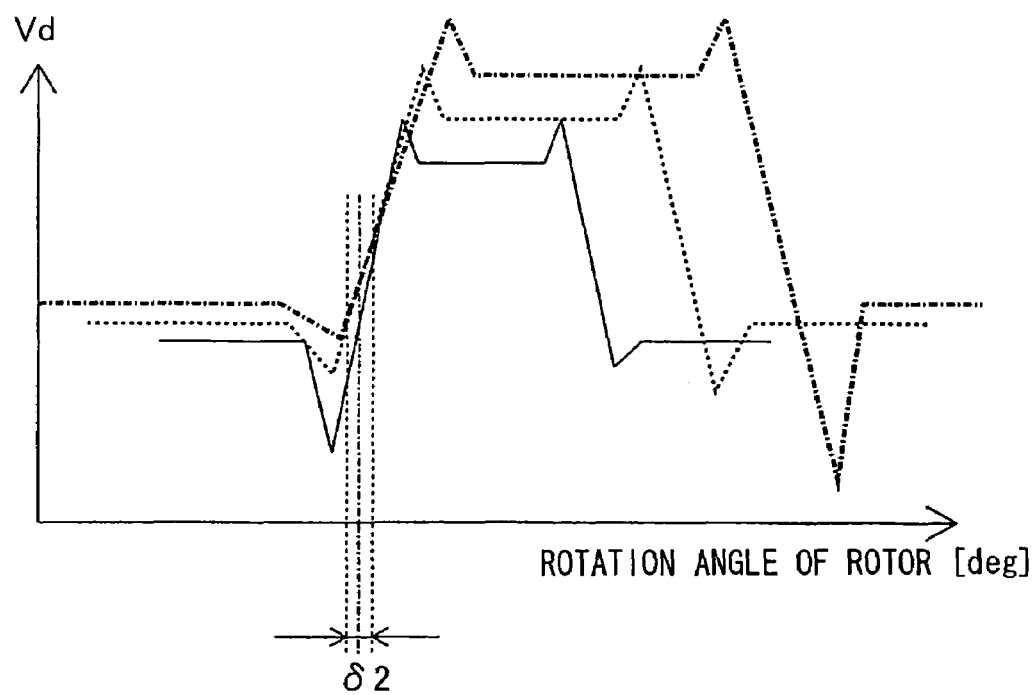
FIG. 6B is a graph showing changes in the output voltage of the differential amplifier after adjusting a variable gain α to minimize a mechanical-electrical variation.
Figure 16A:
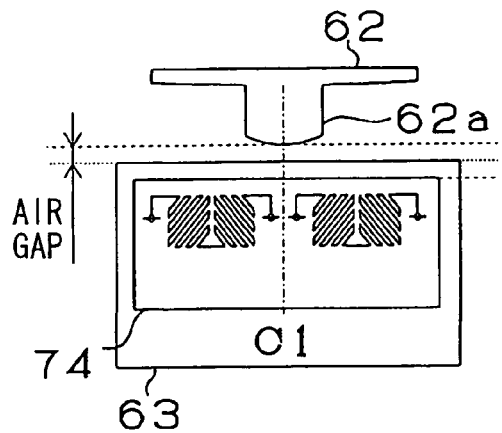
FIGS. 16A, 16B, 16C, 16D, 16E and 16F illustrate relationship between the sensor position and output signals.
Figure 16B:
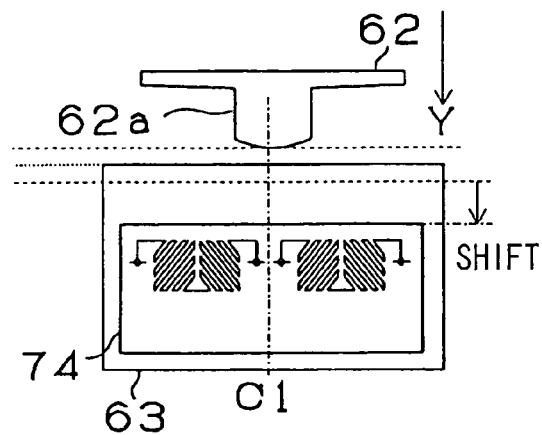
Figure 16C:
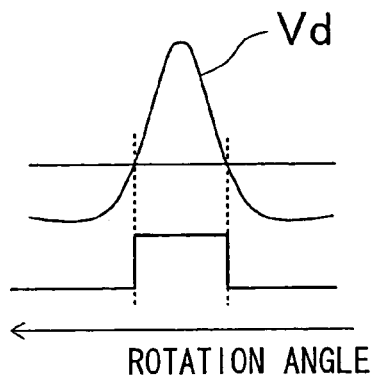
Figure 16D:
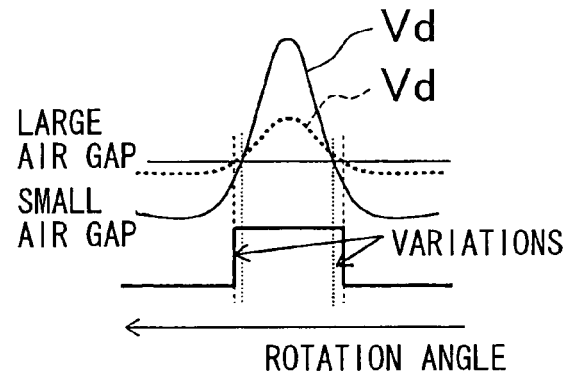
Figure 16E:
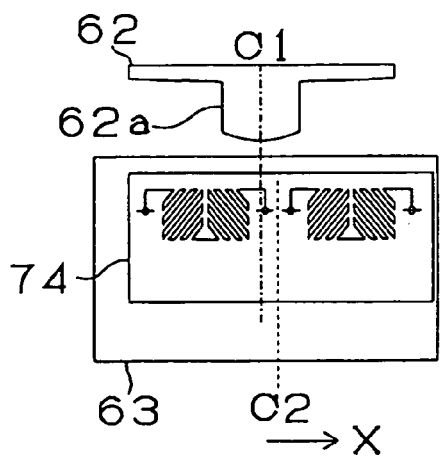
Figure 16F:
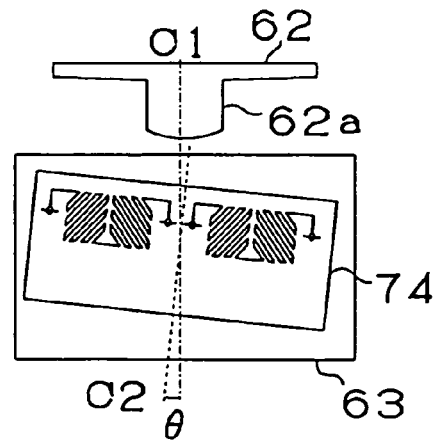

The reference voltage to be applied to the input terminal Cr corresponds to this differential output voltage Vd. If the IC chip is shifted in the X-direction as shown in FIG. 16E, the rotation angle (or the differential output voltage Vd of the differential amplifier circuit 50) varies as shown in FIG. 6A when the rotor rotates. An amount δ1 of the shift is reduced to an amount δ2 of FIG. 6B by changing the variable gain α. Because the shift amount δ1 is caused by both electrical and mechanical variations, the shift amount is hereinafter referred to as the M-E shift amount.

Figure 7A:
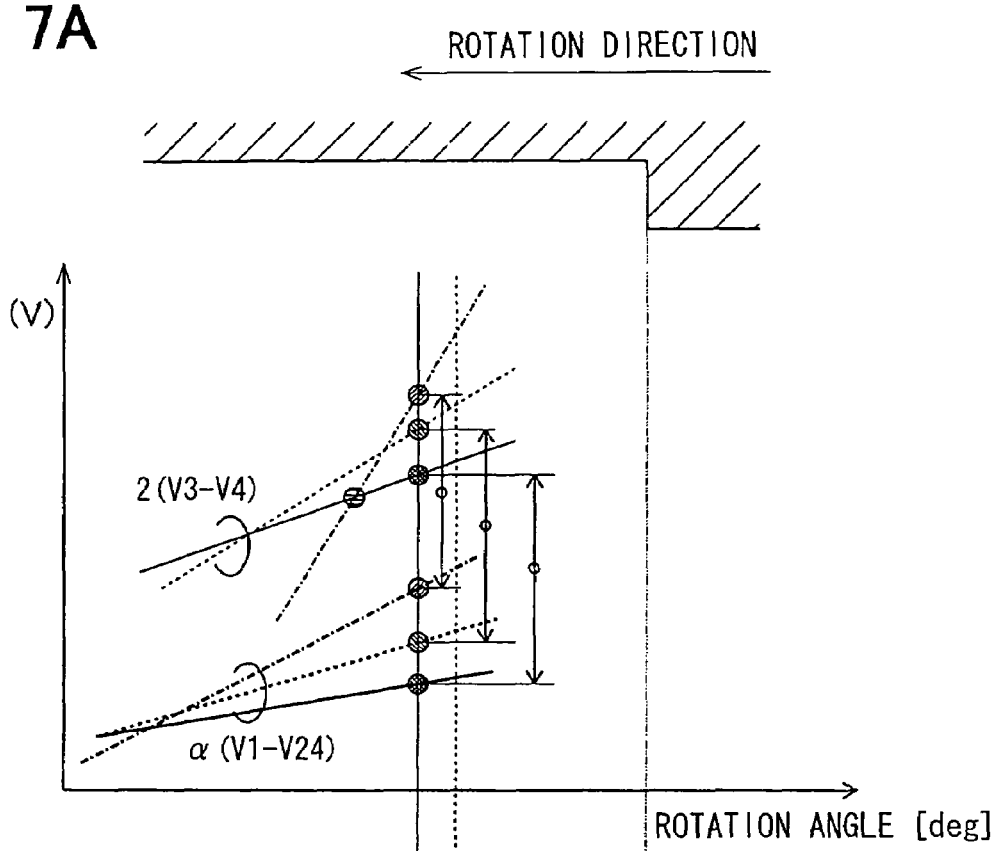
FIG. 7A is a graph showing differential output voltages between two of the four MRE bridge circuits.

The output voltage after the operation on 2(V3−V4) and the output voltage after the operation on α(V1−V2) with cc being not adjusted are shown in FIG. 7A, where a solid line indicates the operations when the air gap is 0.5 mm, a dotted line indicates operations when the air gap is 1.0 mm, and one-dot chain line indicates operations when the air gap is 1.5 mm.

Figure 7B:
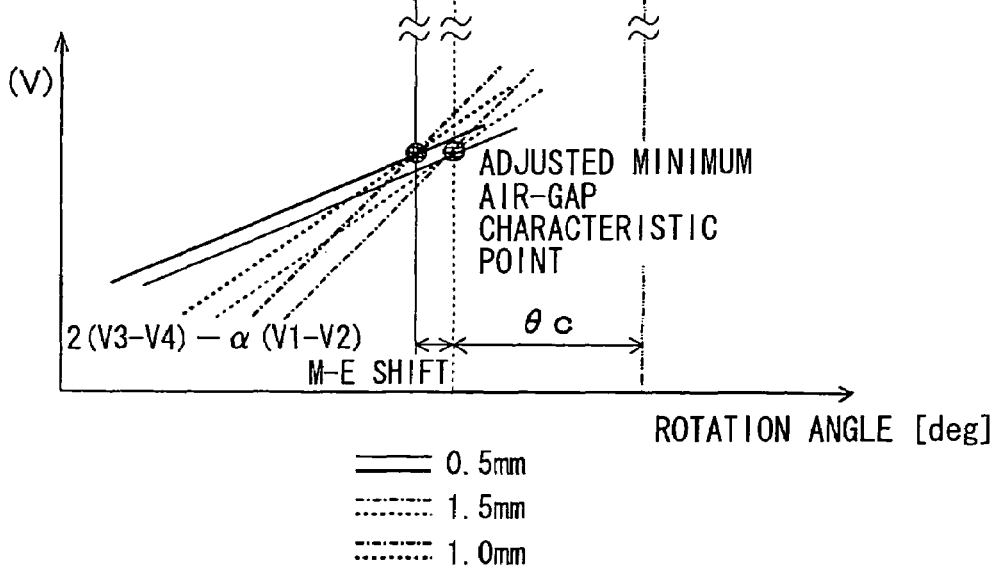
FIG. 7B is a graph showing differential output voltages between the four MRE bridge circuits.

On the other hand, the output voltage after the operation on 2(V3−V4)−α(V1−V2) with α being adjusted is shown in FIG. 7B. FIG. 7B shows that this output voltage accurately corresponds to a rotation angle θc of the leading edge of the tooth of the rotor 12 even if the base plate 30 of the IC chip 20 shifts in the X-direction or the Y-direction.

Figure 8A:
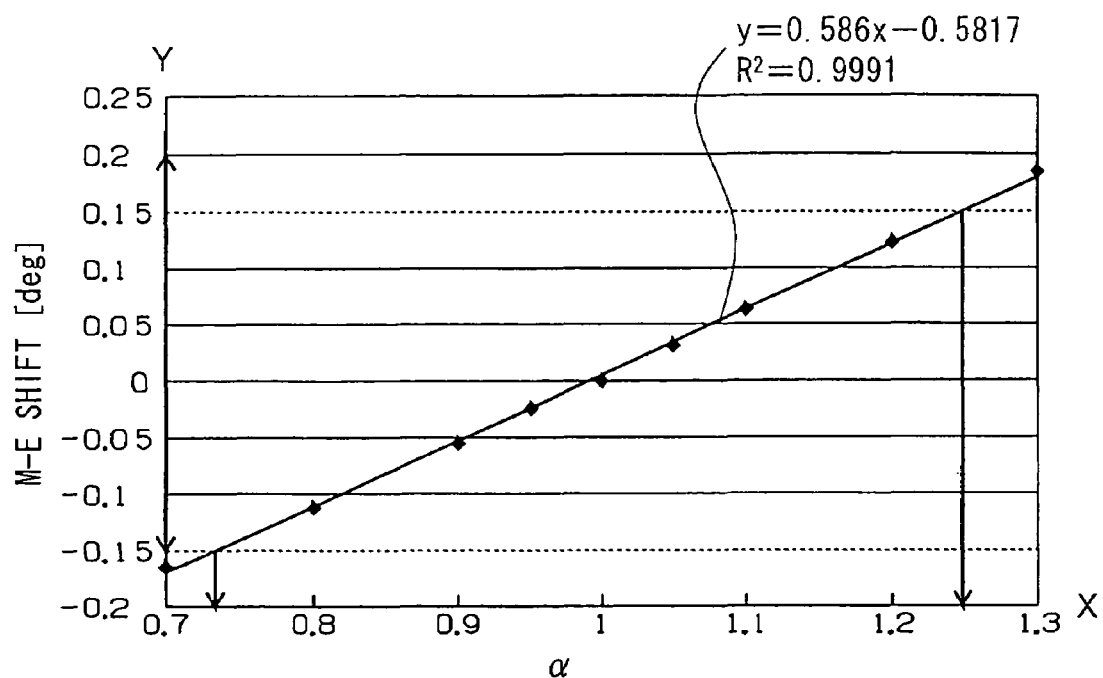
FIG. 8A is a graph showing a simulation to find out a relationship between a M-E shift amount and a variable gain α.

FIG. 8A also shows that the M-E shift amount can be made zero if α is adjusted properly. In FIG. 8A, the linear function is formed by shifting the base plate 30 of the IC chip 20 in the X direction by ±0.07 and in the Y-direction by ±0.15.

Figure 9:
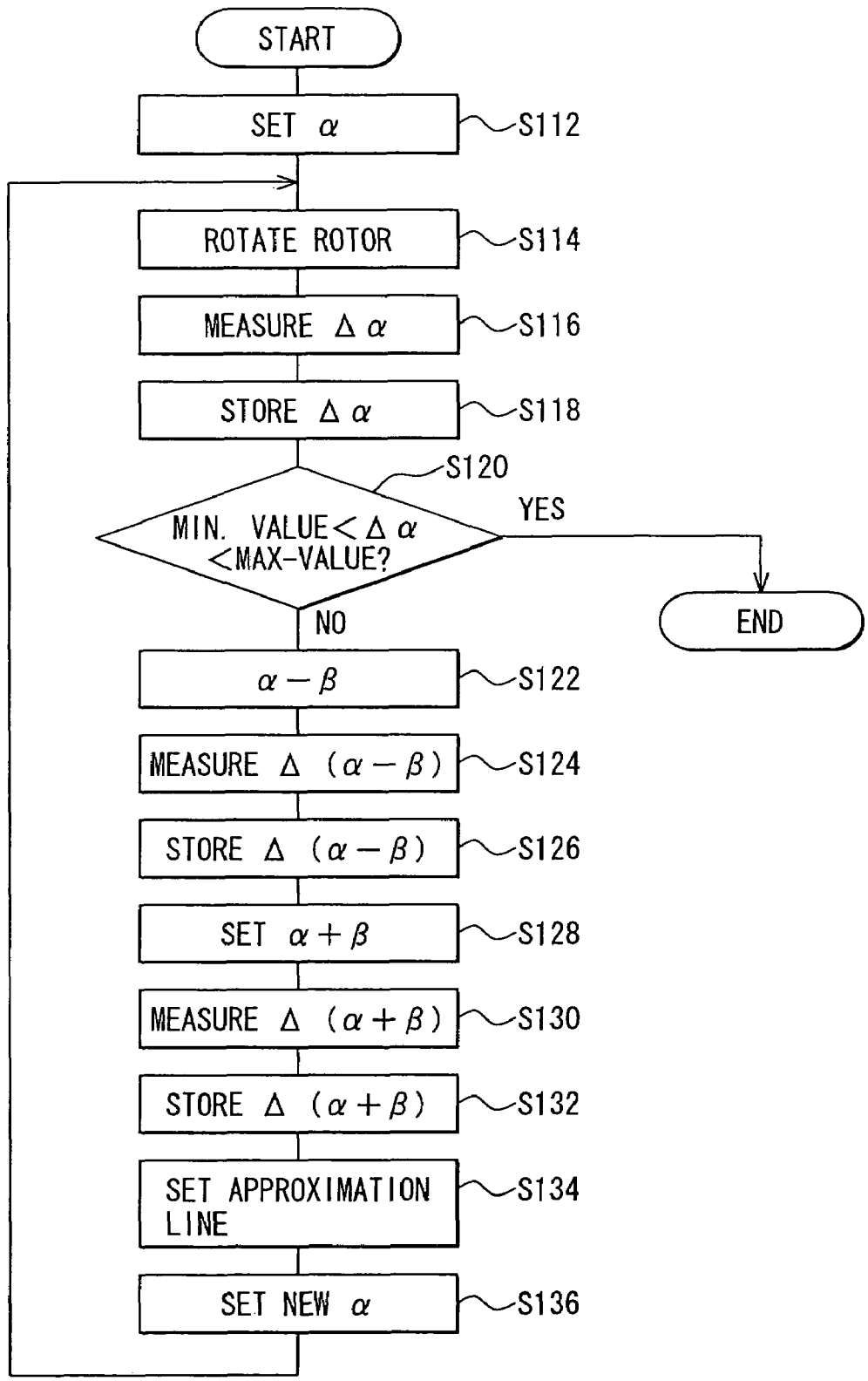
FIG. 9 is a flow diagram of setting an appropriate value of the gain α.

A flow diagram of a process for setting α will be described with reference to FIG. 9. The process starts after the IC chip 20 is mounted on the base plate 30. At S112, a temporary value of α such as "1" is set. Then, the rotor is rotated at S 114, a M-E shift amount Δα is measured at S116, and the M-E shift amount Δα is stored at S118. Thereafter, if the M-E shift amount Δα is between a maximum acceptable value and a minimum acceptable value at S120.

If the M-E shift amount Δα is within the acceptable values (YES), the setting process ends. If, on the other hand, the M-E shift amount Δα is not within the acceptable values (NO), a correction value β such as 0.2 is subtracted from the temporary value of α to have 0.8 at S122. Then, the rotor is rotated to measure a M-E shift amount Δ(α−β) at S124, and the M-E shift amount Δ(α−β) is stored at S126. Subsequently, the correction value β is added to the temporary value of α to have 1.2 at S128. Then, the rotor is rotated to measure a M-E shift amount Δ(α+β) at S130, and the M-E shift amount Δ(α+β) is stored at S132.

Figure 8B:
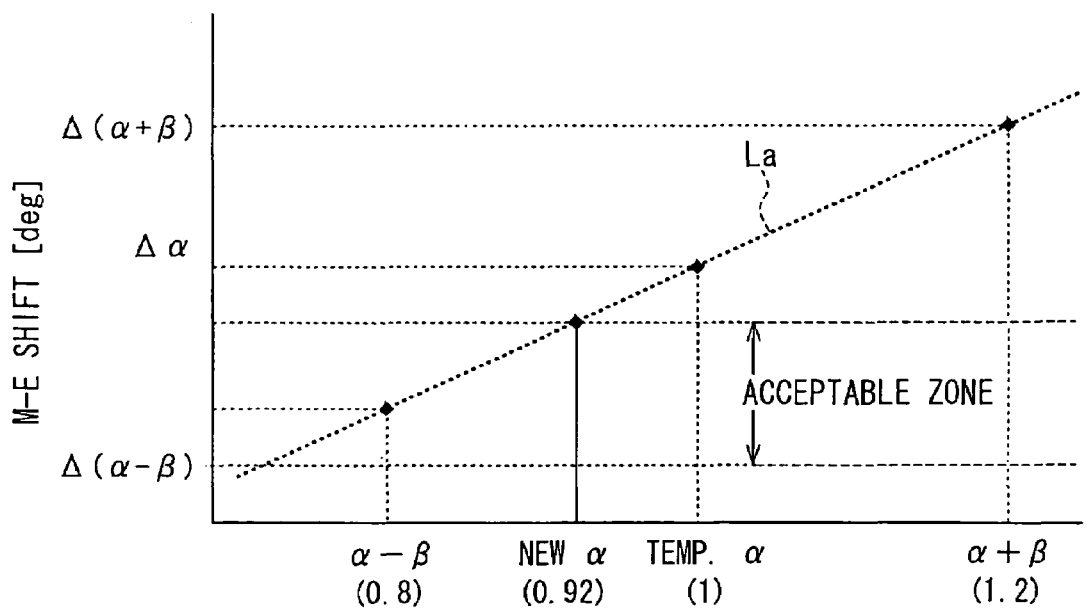
FIG. 8B is a graph showing how to set an appropriate value of the gain α.

Thereafter, an approximation line La, which is a linear equation of α, is set as shown in FIG. 8B at S134, and a new value α, such as 0.92, is set at S136, and the process returns to S 114 to rotate the rotor and subsequently measure a new M-E shift amount Δα at S116. Then, the process goes to S118 and to the following steps until a desired value of α that puts Δα into the acceptable zone is found out at S120.

Figure 10:
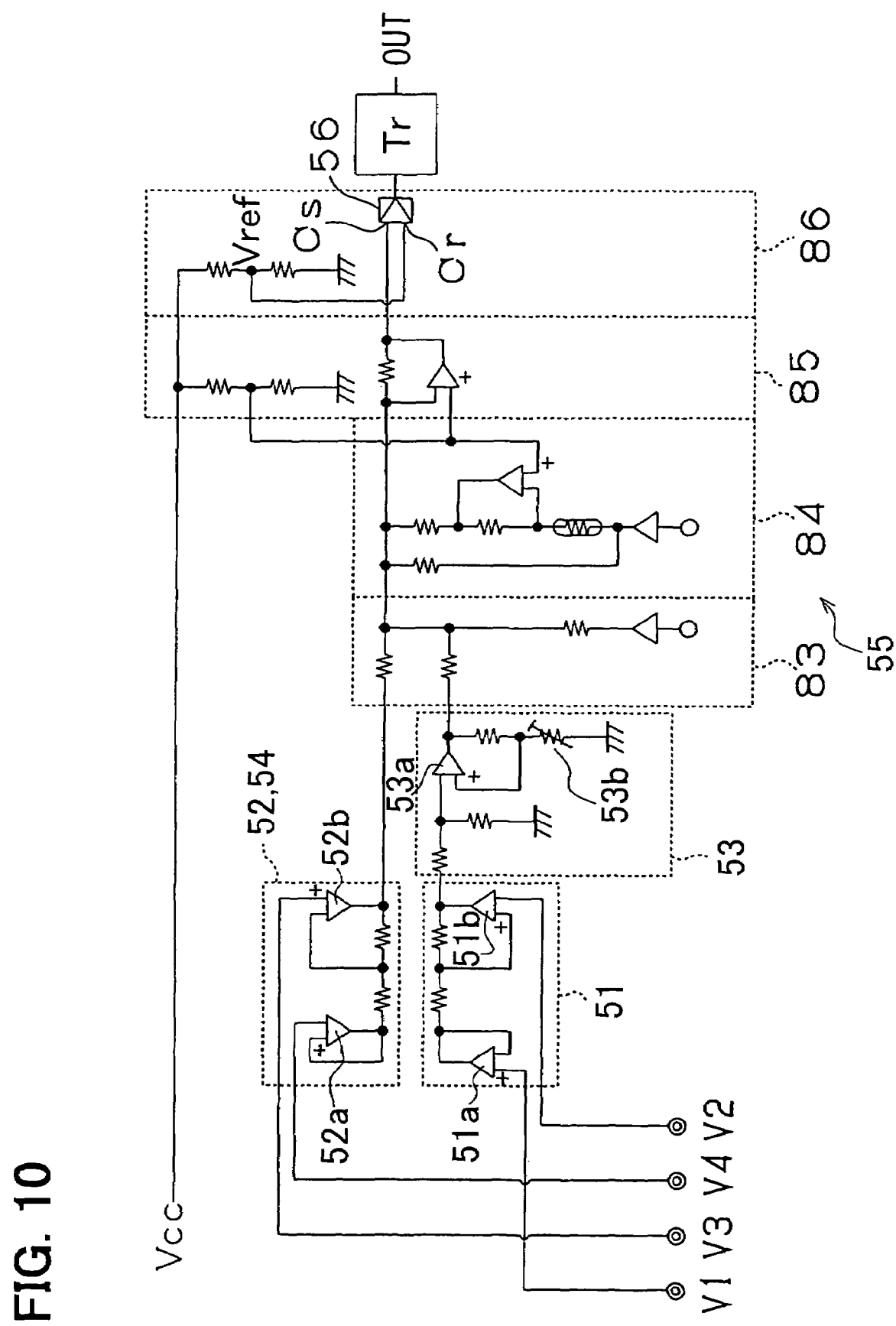
FIG. 10 is a circuit diagram of a differential amplifier circuit of the rotation detecting device according to the first embodiment.

The differential amplifier circuit 50 shown in FIG. 4 will be described in more detail with reference to FIG. 10.

The differential amplifier 51, which provides the output signal of (V1−V2), includes an operational amplifier 51a with its non-inverted input terminal to receive the output voltage V1, an amplifier with its inverted input terminal to receive the output voltage V2 and a pair of resistors.

A pair of operational amplifiers 52a, 52b and a pair of resistors form a combined circuit of the differential amplifier 52 and the amplifier 54, which provides the output voltage of 2×(V3−V4).

The amplifier 53 amplifies includes an operational amplifier and a plurality of resistors that includes a variable resistor 53b connected between the output terminal of the operational amplifier 53a and a ground to provides an amplified output signal of a variable gain α, which is α(V1−V2).

The differential amplifier 55 includes an offset adjusting circuit 83, a temperature compensation circuit 84, a differential amplifier 85 and a comparator circuit 86. The offset adjusting circuit 83 adjusts an offset of the output signals of the amplifiers 53, 54. The differential amplifier 85 provides the output voltage of 2×(V3−V4)−α(V1−V2). The comparator circuit 86 includes the comparator 56 and a voltage dividing resistor circuit. The comparator 56 compares the output voltage of the differential amplifier 85 with the reference voltage Vref provided by the voltage dividing resistor circuit to provide a bi-level signal.

Thus, the rotation angle of the rotor 12 can be accurately detected by setting θc from the leading edge of the tooth of the rotor 12 even if the base plate 30 of the IC chip 20 shifts in the X-direction or the Y-direction. Since the difference between the output voltages V1 and V2 is amplified to be double the difference, it is easy to adjust the gain α.

Figure 11:
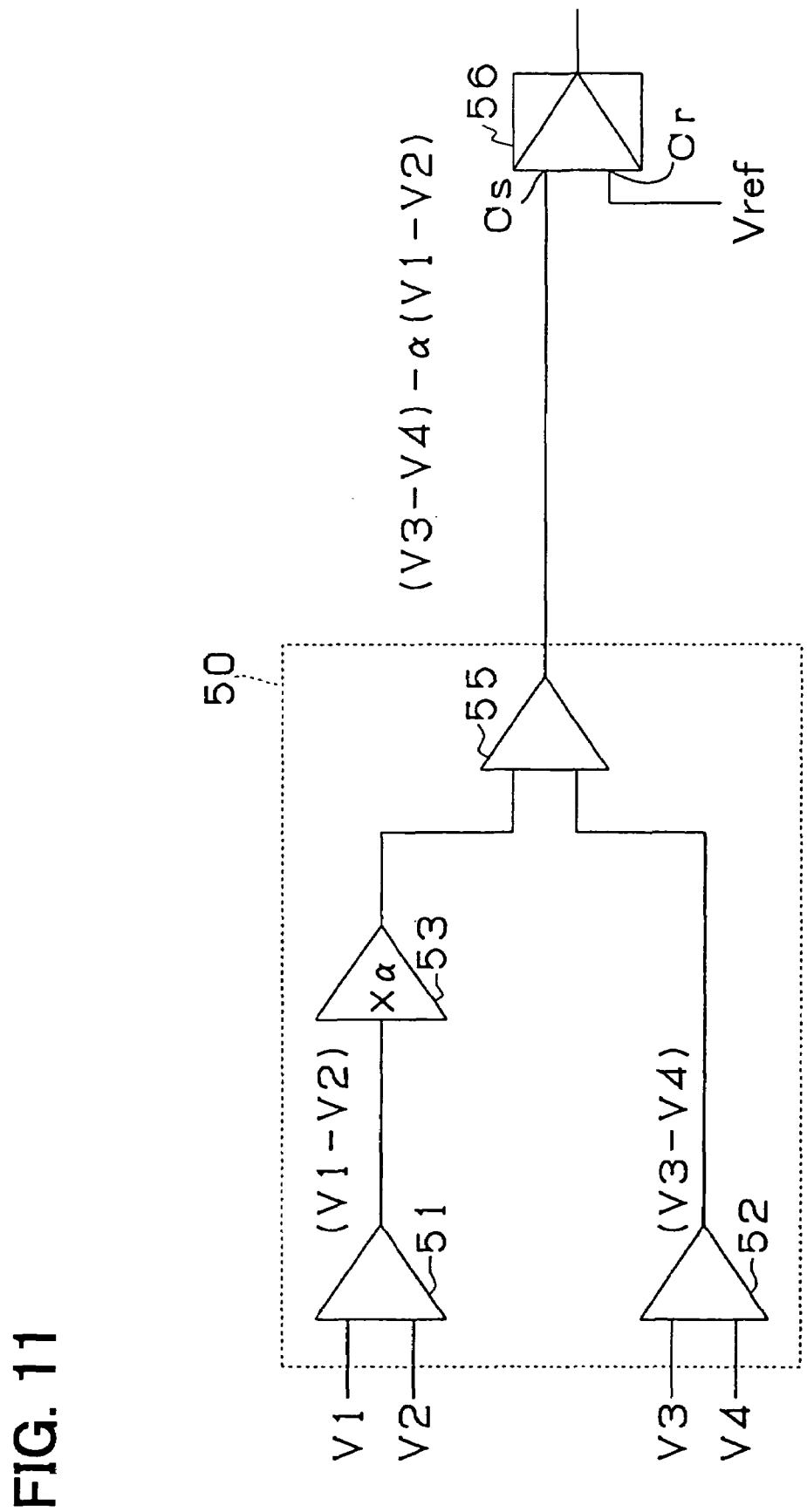
FIG. 11 is a block diagram illustrating a basic idea of a differential amplifier of the rotation detecting device according to the second embodiment.

A rotation detecting device 10 according to the second embodiment of the invention will be described with reference to FIG. 11.

Incidentally, the same reference numeral representing the part, portion or component in the following embodiments will be the same as that of the first embodiment.

The amplifier 54 of the first embodiment is omitted. In this embodiment, the differential amplifier 55 provides an output voltage of (V3−V4)−α(V1−V2). Therefore, the rotation angle of the rotor 12 can be accurately detected by setting θc from the leading edge of the tooth of the rotor 12 even if the base plate 30 of the IC chip 20 shifts in the X-direction or the Y-direction.

Figure 12:
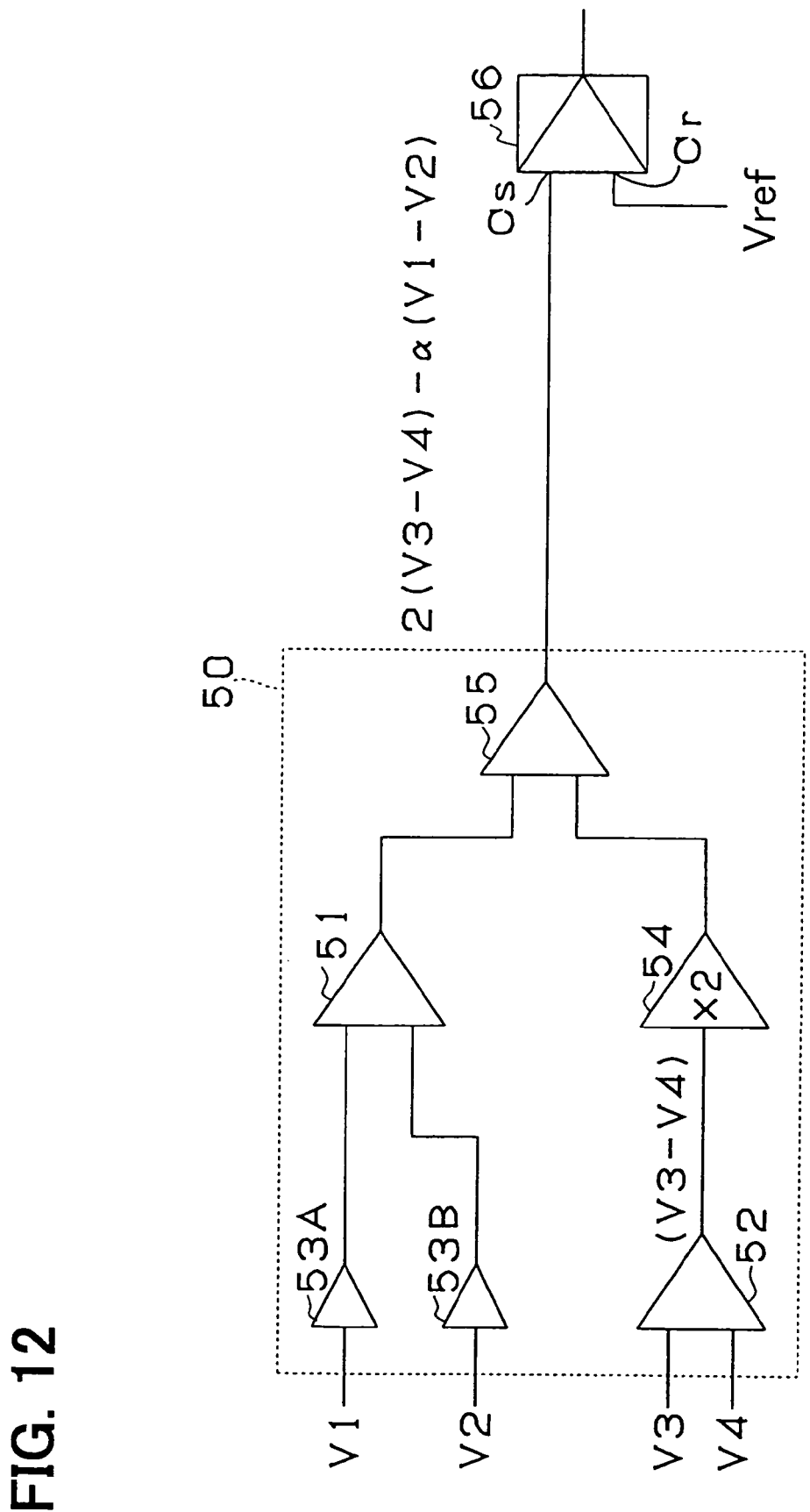
FIG. 12 is a block diagram illustrating a basic idea of a differential amplifier of the rotation detecting device according to the third embodiment.

A rotation detecting device 10 according to the third embodiment of the invention will be described with reference to FIG. 12.

The differential amplifier circuit 50 omits the amplifier 53 and includes amplifiers 53A, 53B respectively connected to the non-inverted input terminal and the inverted terminal of the differential amplifier 51 of the first embodiment. The amplifier 53A amplifies the output voltage V1 to provide αV1, and the amplifier amplifies the output voltage V2 to provide αV2. Accordingly, the differential amplifier 51 provides the output signal α(V1−V2). The rotation angle of the rotor 12 can be detected in substantially the same manner as the above embodiments.

Figure 13:
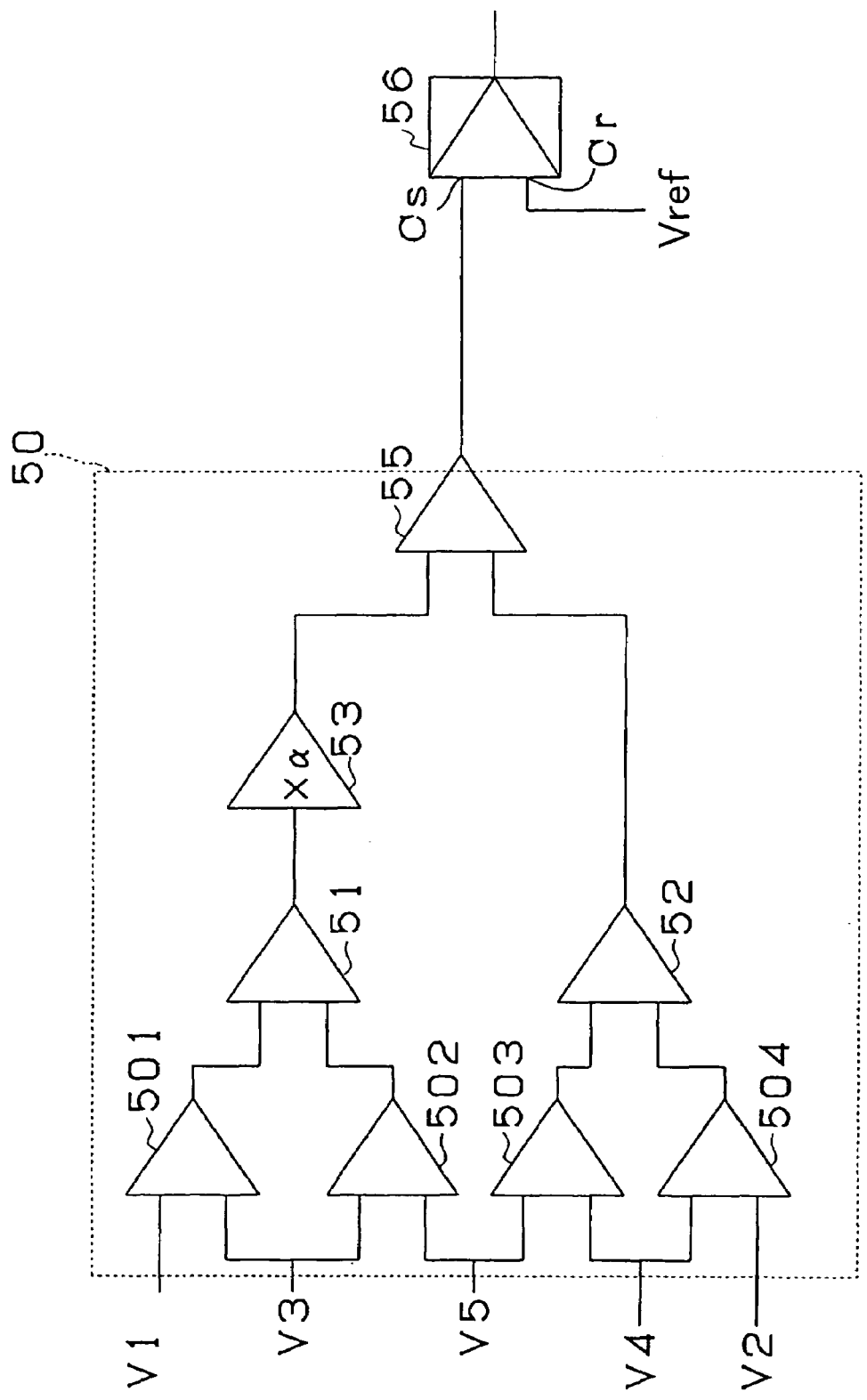
FIG. 13 is a block diagram illustrating a basic idea of a differential amplifier of the rotation detecting device according to the fourth embodiment.

A rotation detecting device 10 according to the fourth embodiment of the invention will be described with reference to FIGS. 13 and 14.

Figure 14:
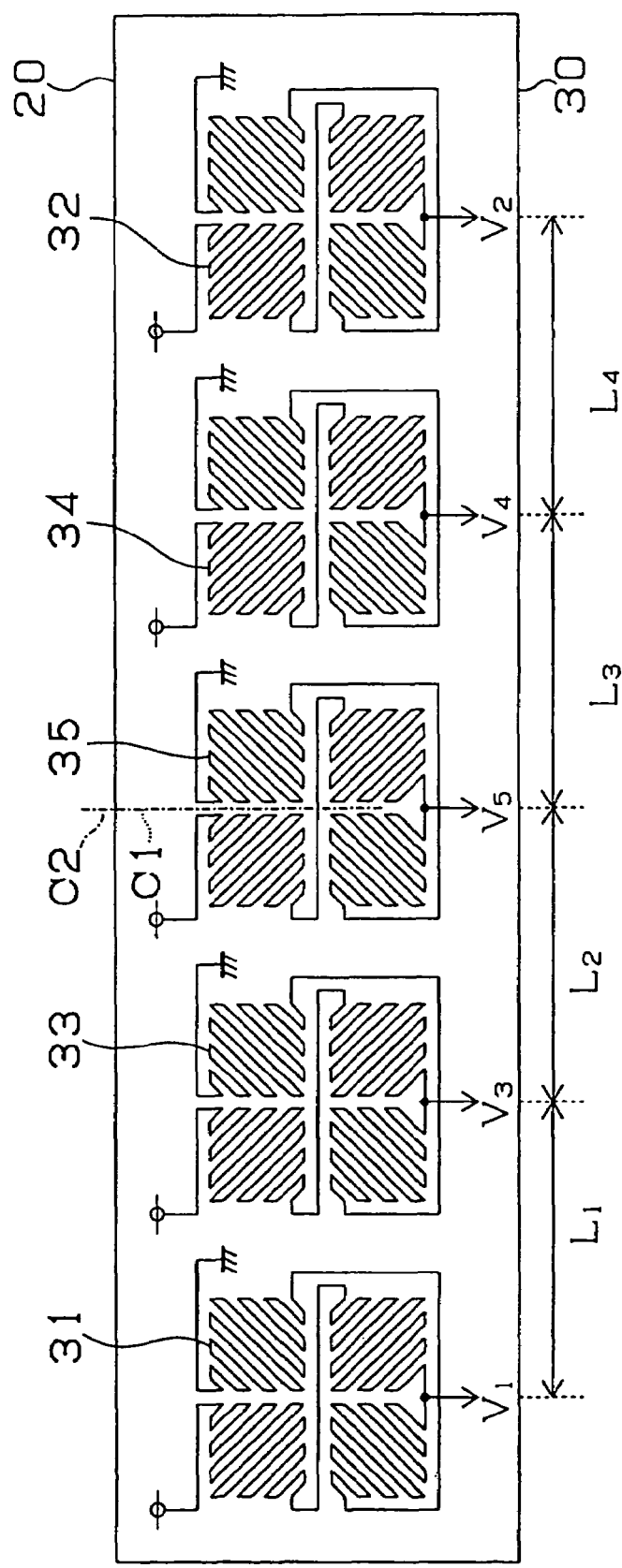
FIG. 14 is a schematic diagram showing an IC chip of the rotation detecting device according to the fourth embodiment.
Figure 15:
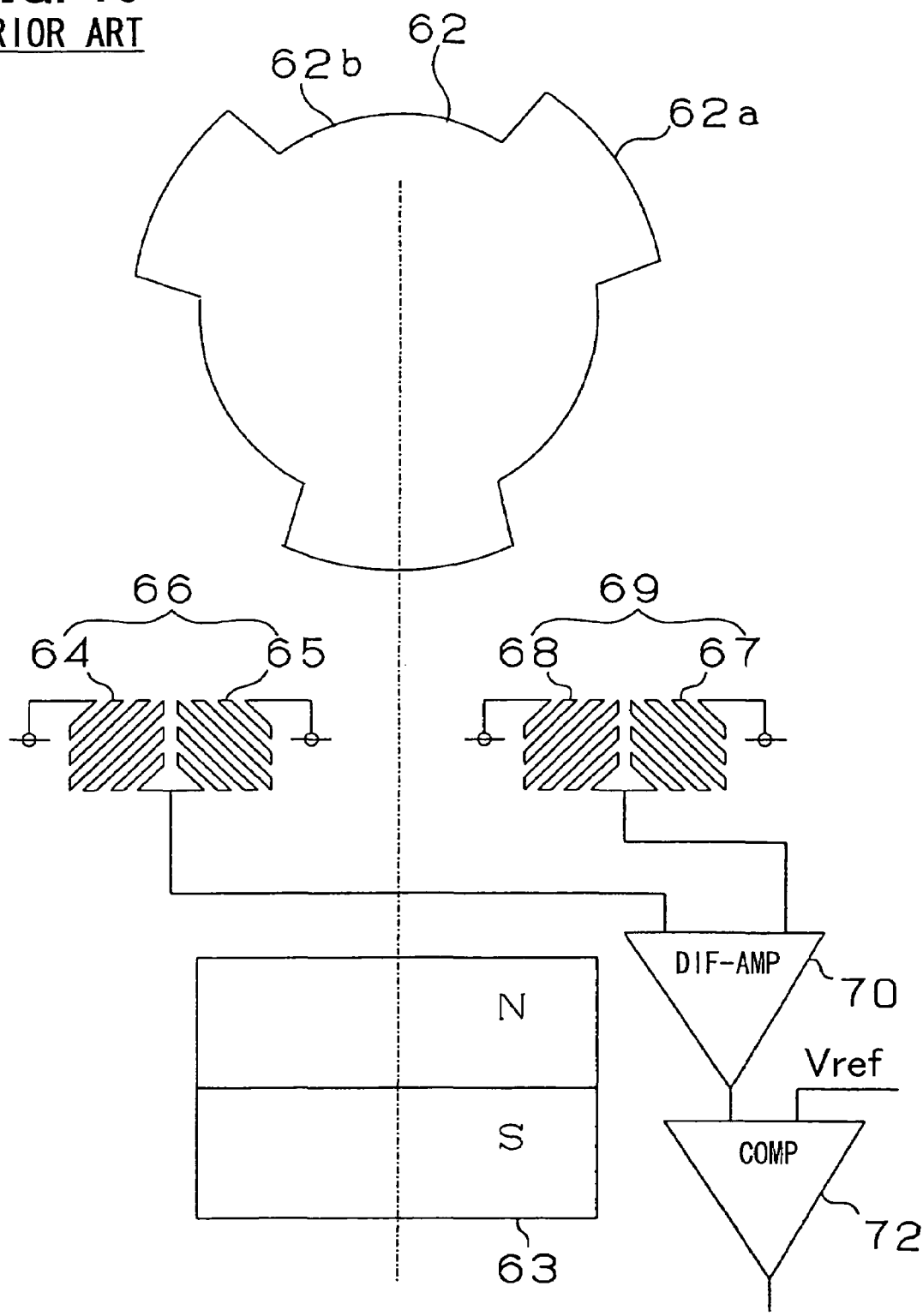
FIG. 15 is a schematic diagram showing a prior art rotation detecting device.

As shown in FIG. 14, the IC chip 20 is comprised of a base plate 30 and five MRE bridge circuits 31, 32, 33, 34, 35 which are the same in structure and characteristic. The IC chip 20 is mounted on a lead frame made of copper or the like and molded into a unit with thermosetting resin such as epoxy resin. The IC chip 20 is disposed so that a portion thereof is inserted to the center hole of the biasing magnet 14 and so that a center line (a line of symmetry) C2 of the base plate 30 coincides with the rotation axis C1 of the biasing magnet 14.

The MRE bridge circuit 31 and the MRE bridge circuit 32 are disposed to be symmetrical to each other with respect to the center line C2, and the MRE bridge circuit 33 and the MRE bridge circuit 34 are also disposed to be symmetrical to each other with respect to the center line C2. The MRE bridge circuit 33 is disposed at the middle between the center line C2 and a centerline of the MRE bridge circuit 31, and the MRE bridge circuit 34 is disposed at the middle between the center line C2 and a center line of MRE bridge circuit 32. Further, the bridge circuit 35 is disposed on the base plate so that the center line of the bridge circuit 35 coincides with the center line C2 of the base plate.

Thus, the distance L1 between the center lines of the MRE bridge circuits 31, 33, the distance L2 between the center lines of the MRE bridge circuit 33 and the center line C2, the distance L3 between the center line C2 and the center line of the MRE bridge circuit 34, 33 and the distance L4 between the center lines of the MRE bridge circuits 34, 32 are the same (L1=L2=L3=L4).

The differential amplifier circuit 50 includes differential amplifiers 501, 502, 503 and 504 in addition to the differential amplifiers 51, 52 and the amplifier 53. The differential amplifier 501 provides its output voltage of V1–V3, the differential amplifier 502 provides its output voltage of V3–V5, the differential amplifier provides 503 its output voltage of V5–V4, and the differential amplifier 504 provides its output voltage of V4–V2.

The differential amplifier 51 provides its output voltage of {(V1–V3)–(V3–V5)}, and the amplifier 53 provides its output voltage of α{(V1–V3)–(V3–V5)}. The differential amplifier 52 provides its output voltage of {(V5–V4)–(V4–V2)}. Finally, the differential amplifier 55 provides its output voltage Vd:

$$Vd=\alpha\{(V1-V3)-(V3-V5)\}-\{(V5-V4)-(V4-V2)\} \quad [E4]$$

However, it is possible to provide the following output voltage Vd by changing input terminals of the differential amplifiers:

$$Vd=\{(V5-V4)-(V4-V2)\}-\alpha\{(V1-V3)-(V3-V5)\} \quad [E5]$$

Incidentally, the output voltage Vd of [E4] is nearly equal to Vd of [E 2] if (αV5–V5) is nearly zero, and the output voltage Vd of [E5] is nearly equal to Vd of [E 3] if (αV5–V5) is nearly zero.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation detecting device comprising:
   a magnetic rotary member having a plurality of teeth on its outer periphery;
   a biasing magnet having a magnetic center axis for providing said rotary member with a magnetic field;
   a magnetic sensor unit disposed between said teeth and said biasing magnet, said magnetic sensor unit including at least four bridge circuits of magnetoresistive elements being arranged to respectively provide voltage signals V1, V2, V3 and V4 that change with a change in the direction of the magnetic field; and
   a differential amplifier circuit for providing a differential output signal Vd, said differential amplifier circuit including a first differential amplifier for providing a first differential signal that is a difference between the voltage signals V1 and V2, a second differential amplifier for providing a second differential signal that is a difference between the voltage signals V3 and V4, first means for providing a first amplified signal of the first differential signal amplified by a variable gain α, second means for providing a second amplified signal of the second differential signal amplified by a fixed gain and a third differential amplifier for providing the differential output signal Vd that is a difference between the first amplified signal and the second amplified signal,
   wherein the variable gain is adjusted to provide a minimum air-gap characteristic point that corresponds to a fixed rotation angle relative to one of the teeth of said magnetic rotary member.

2. The rotation detecting device as claimed in claim 1, wherein
   the first differential signal is V1–V2;
   the second differential signal is V3–V4;
   the first amplified signal is α(V1–V2);
   the second amplified signal is 2(V3–V4); and
   the differential output signal Vd is 2(V3–V4)–α(V1–V2).

3. The rotation detecting device as claimed in claim 1, wherein
   the first differential signal is V2–V1;
   the second differential signal is V4–V3;
   the first amplified signal is α(V2–V1);
   the second amplified signal is 2(V4–V3); and
   the differential output signal Vd is 2(V4–V3)–α(V2–V1).

4. The rotation detecting device as claimed in claim 1, wherein
   the first differential signal is V1–V2;
   the second differential signal is V3–V4;
   the first amplified signal is α(V1–V2);
   the second amplified signal is V3–V4; and
   the differential output signal Vd is V3–V4–α(V1–V2).

5. The rotation detecting device as claimed in claim 1, wherein
   the first differential signal is V2–V1;
   the second differential signal is V4–V3;
   the first amplified signal is α(V2–V1);
   the second amplified signal is V4–V3; and
   the differential output signal Vd is V4–V3–α(V2–V1).

6. The rotation detecting device as claimed in claim 1, wherein:
   each of said bridge circuits has a detecting axis and four magnetic sensor elements;
   said four magnetic sensor elements are disposed in a matrix to be parallel to the magnetic center of said biasing magnet so that two of said sensor elements can be disposed in the first column and the other two sensor elements can be disposed in the second column; and
   the detecting axis of each sensor element is angled to the magnetic center of said biasing magnet axis by 45 degrees and to the detecting axis of another sensor adjacent thereto by 90 degrees; and
   said four magnetic sensor elements are connected in series with each other thereby providing a sensor output signal at the middle of the series connected sensor elements.

7. The rotation detecting device as claimed in claim 1, further comprising a comparator for comparing the differential output signal with a preset level to provide a binary signal.

8. The rotation detecting device as claimed in claim 1 further comprising means for setting a suitable value of the gain α,
   wherein said means executes a program that comprises the steps of:
   setting a temporary value of α;
   rotating the rotor to measure a M-E shift amount Δα;
   subtracting a correction value β from the temporary value of α;
   adding the value β to the temporary value of α;
   rotating the rotor to measure a M-E shift amount Δ(α+β);
   setting an approximation line La; and
   setting a new value α;
   repeating the above step until a desired value of α is found.

* * * * *